US009773334B1

(12) United States Patent
Walker et al.

(10) Patent No.: US 9,773,334 B1
(45) Date of Patent: Sep. 26, 2017

(54) HIGH PERFORMANCE, LOW LATENCY COMBINED VISION SYSTEM FOR USE IN DEGRADED VISUAL ENVIRONMENTS

(71) Applicant: Rockwell Collins, Inc., Cedar Rapids, IA (US)

(72) Inventors: Brad A. Walker, Mount Vernon, IA (US); Sung J. Kim, Cedar Rapids, IA (US); Allen P. Mass, Lisbon, IA (US); John K. Gee, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 521 days.

(21) Appl. No.: 14/474,778

(22) Filed: Sep. 2, 2014

(51) Int. Cl.
| G06T 7/00 | (2017.01) |
| G06T 11/60 | (2006.01) |
| G06T 1/20 | (2006.01) |
| G06T 7/90 | (2017.01) |
| H04N 1/60 | (2006.01) |
| B64D 43/00 | (2006.01) |

(52) U.S. Cl.
CPC ............ G06T 11/60 (2013.01); B64D 43/00 (2013.01); G06T 1/20 (2013.01); G06T 7/90 (2017.01); H04N 1/6027 (2013.01); G06T 2207/10016 (2013.01)

(58) Field of Classification Search
CPC ............ G06T 11/60; G06T 1/20; B64D 43/00
See application file for complete search history.

(56) References Cited

U.S. PATENT DOCUMENTS

| 7,840,066 | B1 * | 11/2010 | Chen | G06T 5/002 |
| | | | | 382/168 |
| 2003/0227460 | A1 * | 12/2003 | Schinnerer | G09G 5/363 |
| | | | | 345/539 |
| 2004/0075741 | A1 * | 4/2004 | Berkey | G08B 13/19636 |
| | | | | 348/159 |
| 2004/0169617 | A1 * | 9/2004 | Yelton | G06T 15/04 |
| | | | | 345/1.1 |
| 2009/0228224 | A1 * | 9/2009 | Spanier | G01R 22/10 |
| | | | | 702/60 |
| 2012/0081519 | A1 * | 4/2012 | Goma | H04N 5/247 |
| | | | | 348/47 |
| 2016/0066000 | A1 * | 3/2016 | Cunningham | H04N 21/242 |
| | | | | 725/116 |

* cited by examiner

*Primary Examiner* — David F Dunphy
(74) *Attorney, Agent, or Firm* — Angel N. Gerdzhikov; Donna P. Suchy; Daniel M. Barbieri

(57) ABSTRACT

A method includes receiving a stream of synthetic images from a synthetic vision system and receiving a stream of sensor images from at least one sensor. The method also includes performing, by a processing array including a plurality of parallel processing elements, one or more fusion operations on a particular synthetic image of the stream of the synthetic images and one or more particular sensor images of the stream of the sensor images. Upon performing one or more fusion operations on the particular synthetic image of the stream of the synthetic images and the one or more particular sensor images of the stream of sensor images, the method further includes outputting a combined image to a display for presentation to a user.

18 Claims, 6 Drawing Sheets

HIGH PERFORMANCE, LOW LATENCY COMBINED VISION SYSTEM FOR USE IN DEGRADED VISUAL ENVIRONMENTS

FIELD OF THE INVENTION

Embodiments of the invention are directed generally toward a method, apparatus, and system related to aircraft vision systems, and more particularly to combined vision systems which combine synthetic images and sensor images.

BACKGROUND

Current combined vision systems (CVSs), which combine synthetic imagery and real world sensor imagery, suffer from a high delay (i.e., high latency) between the conditions of a combined image presented to a pilot and the real time conditions that a pilot is observing through a cockpit window of the aircraft. When an aircraft is flying, the combined image generated by a CVS, which is presented on a display, lags behind the real state of the aircraft due to the time it takes to: a) capture data with a sensor; b) generate a synthetic vision system (SVS) image from aircraft state data; c) blend the two image sources into a combined image; and d) present the combined image on a display. This latency creates a risk that the pilot will be unaware of the true state of the aircraft when viewing a CVS display rather than looking out the cockpit window. In a degraded visual environment, such as rain, fog, snow, or dust, the pilot may see nothing out his cockpit window and be totally reliant on the CVS display. In such degraded visual environment cases, the high delay of current CVSs presents problems.

For example, the high delay in current combined images often results in the combined images not accurately depicting the actual environment outside the aircraft. The delay between the conditions represented in the combined image and the actual real time conditions is especially problematic when operating a helicopter in a degraded visual environment where the pilot may be unable to see the helicopter's surroundings through a cockpit window during takeoff or landing because of airborne dust and debris.

Therefore, it would be desirable to provide a method, apparatus, and system which provide solutions to the aforementioned existing problems.

SUMMARY

In one aspect, embodiments of the inventive concepts disclosed herein are directed to a method which includes receiving a stream of synthetic images from a synthetic vision system and receiving a stream of sensor images from at least one sensor. The method also includes performing, by a processing array including a plurality of parallel processing elements, one or more fusion operations on a particular synthetic image of the stream of the synthetic images and one or more particular sensor images of the stream of the sensor images. Upon performing one or more fusion operations on the particular synthetic image of the stream of the synthetic images and the one or more particular sensor images of the stream of sensor images, the method further includes outputting a combined image to a display for presentation to a user.

In a further aspect, embodiments of the inventive concepts disclosed herein are directed to a combined vision system including a plurality of input line buffers and a processing array. A first input line buffer of the plurality of input line buffers is configured to store at least a portion of one or more synthetic image inputs of a stream of synthetic images. At least a second input line buffer is configured to store at least a portion of one or more sensor image inputs of a stream of sensor images. The processing array includes a row of parallel processing elements. Each processing element includes a plurality of memory elements and a processing unit. Each processing element is configured to perform one or more fusion operations on a portion of a particular synthetic image of the stream of the synthetic images and a portion of one or more particular sensor images of the stream of the sensor images. Each processing element is further configured to output a portion of a combined image.

In yet another aspect, embodiments of the inventive concepts disclosed herein are directed to a system including a synthetic vision system, at least one sensor, at least one display, and a combined vision system. The combined vision system is coupled to the synthetic vision system, the at least one sensor, and the at least one display. The combined vision system includes a processing array. The processing array includes a row of parallel processing elements. Each processing element includes a plurality of memory elements and a processing unit. Each processing element is configured to perform one or more fusion operations on a portion of a particular synthetic image of a stream of synthetic images and a portion of one or more particular sensor images of a stream of sensor images. Each processing element is further configured to output a portion of a combined image. The combined vision system is configured to output combined images to the at least one display.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include a combined vision system (CVS) configured to merge synthetic vision system (SVS) imagery (e.g., images generated and/or sourced from a database driven by the aircraft's state data) with imagery from one or more sensors that are capturing real information from the aircraft's environment. Embodiments of the invention are configured to generate combined images which retain important features of each image source so that the pilot is able to observe important details from each image source in the combined image. Additionally, embodiments of the invention are configured to merge (e.g., blend, combine, fuse, or the like) the source images quickly, with little latency, so that the scene the pilot views outside a cockpit window matches a combined image on a display. In some embodiments, the CVS may be implemented in an aircraft (e.g., a helicopter, an airplane, or the like).

Figure 1:
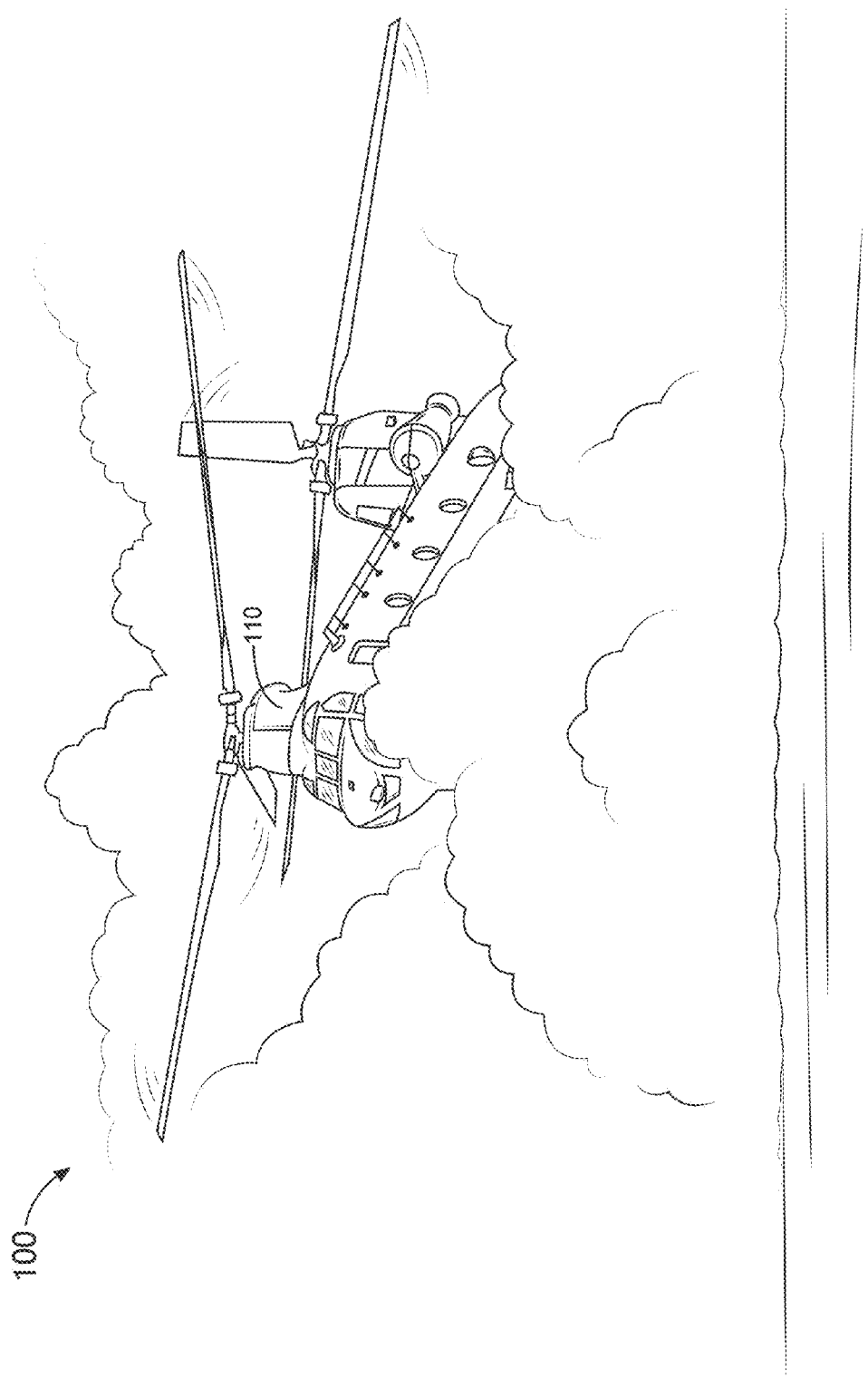
FIG. 1 depicts an aircraft operating in a degraded visual environment.

Referring now to FIG. 1, an aircraft 110 operating (e.g., landing, taking off, flying at low altitude, or otherwise flying) in an exemplary degraded visual environment 100 is shown. The degraded visual environment 100 may include rain, fog, snow, dust, or the like. As can be seen in FIG. 1, when operating the aircraft 110 in a degraded visual environment 100, the pilot may not be able to view the environment through a cockpit window and may have to rely on a CVS.

Figure 2:
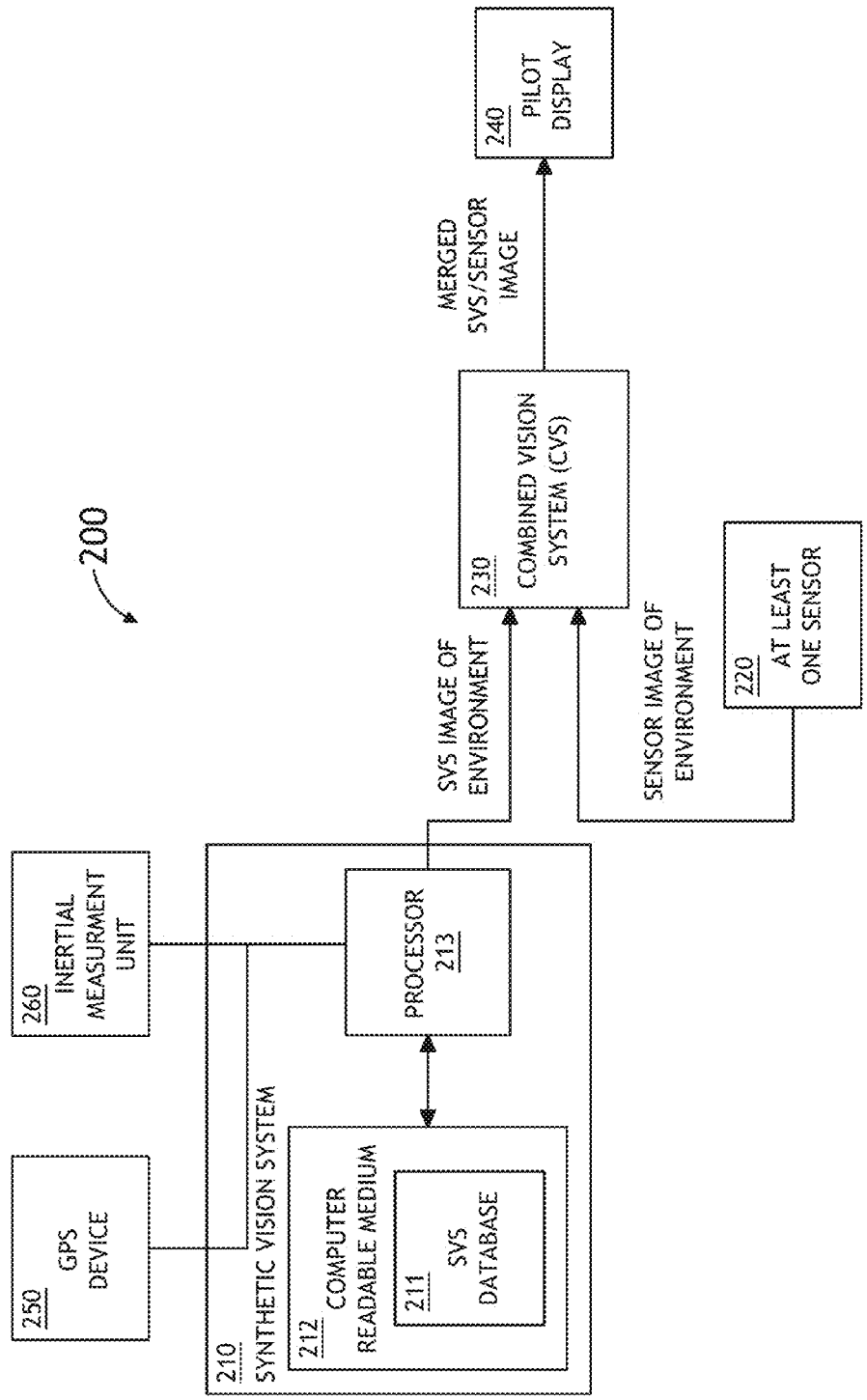
FIG. 2 shows an exemplary system topology of some embodiments.

Referring now to FIG. 2, an exemplary system 200 of an aircraft 110 of some embodiments is shown. In some embodiments, the exemplary system 200 includes a synthetic vision system (SVS) 210, at least one sensor 220, a combined vision system (CVS) 230, at least one display 240, a global positioning system (GPS) device 250, and an inertial measurement unit 260. The SVS 210, the at least one sensor 220, the CVS 230, the at least one display 240, the GPS device 250, and the inertial measurement unit 260 may be communicatively coupled to each other.

In some embodiments, the SVS 210 includes at least one processor 213 coupled to a computer readable medium 212. The computer readable medium 212 may comprise memory, cache, storage, or the like. In some embodiments, the computer readable medium 213 is implemented within a storage device, such as a hard-disk drive, solid state drive, hybrid solid state drive, or the like. In some embodiments, the computer readable medium 212 may store a data structure (e.g., an SVS database 211) of a flight environment. In some embodiments, the data structure contains data of a plurality of synthetic images or synthetic image components and aircraft states, wherein each of the plurality of synthetic images or synthetic image components may be associated with particular aircraft state data. The aircraft state data may include information of an aircraft's location and an aircraft's orientation, as well as other information.

In some embodiments, the processor 213 of the SVS 210 may be configured to receive aircraft location data from the GPS device 250 and configured to receive aircraft orientation data from the inertial measurement unit 260, wherein the aircraft location data and the aircraft orientation data correspond to a current state of the aircraft. In response to receiving aircraft location data and aircraft orientation data, the processor 213 may be configured to access the data structure (e.g., SVS database 211) of the computer readable medium 212 to obtain synthetic image data associated with the received aircraft location data and aircraft orientation data. Once the processor 213 has received the synthetic image data from the data structure (e.g., SVS database 211) of the computer readable medium 212, the processor 213 may generate a synthetic image of an aircraft environment based on the current aircraft location, current aircraft orientation, and data of the data structure (e.g., SVS database 211). Upon generating a synthetic image of an aircraft environment, the processor may output the generated synthetic image to the combined vision system (CVS) 230.

In some embodiments, the at least one sensor 220 is configured to capture images of the aircraft environment or to sense data, which may be used to generate images of the aircraft environment based on the sensed data. In some embodiments, the at least one sensor may be configured to capture images of the environment and/or to generate images based on sensed data. In some embodiments, the at least one sensor 220 includes a processor, memory, storage, and/or the like, wherein the processor may be configured to generate an image of the aircraft environment based on the sensed data. The at least one sensor 220 may comprise any number (e.g., one, two, . . . , 100, or more) of sensors. Additionally, the at least one sensor 220 may comprise any type of sensor(s) and/or combinations of different types of sensors suitable to sense information of an aircraft's environment, wherein the sensed information may be utilized to generate images of the aircraft's environment. For example, in some embodiments, the at least one sensor 220 may be implemented as a light radar ("LIDAR") system, one or more infrared systems (e.g., short-wavelength infrared (SWIR), mid-wavelength infrared (MWIR), long-wavelength infrared (LWIR), or the like), a camera, or combinations thereof. In some embodiments, the at least one sensor 220 may be configured to output raw sensor data to another device (such as the CVS 230) such that the other device may generate images of the aircraft environment based on the raw sensor data, while in other embodiments, the at least one sensor 220 may be configured to generate images of the aircraft environment based on the raw sensor data and output the images to the CVS 230.

In some embodiments, the CVS 230 is configured to receive a stream of synthetic images from the SVS 210 and receive a stream of sensor images based on sensor data of the at least one sensor 220. Upon receiving a particular synthetic image of the stream of synthetic images and a particular sensor image of the stream of sensor images, the CVS 230 is configured to merge the particular synthetic image and the particular sensor image into a combined image, which includes information and/or details of the particular synthetic image and the particular sensor image. The CVS 230 may output the combined image to at least one display 240 for presentation to a pilot.

Exemplary embodiments which include the CVS 230 are described in more detail with respect to FIG. 3, below.

In some embodiments, the at least one display 240 includes one or more displays, projectors (such as an image projector, a retina projector, or the like), liquid crystal cells, and/or light emitting diodes (LEDs). Exemplary display devices may include a head-up display (HUD), a head-down display, a head-mounted display (HMD), an integrated display system, and/or the like. In some embodiments, the at least one display 240 includes a touchscreen display. The at least one display 240 may be configured to receive a stream of combined images from the CVS 230 and present the stream of combined images to a pilot as video.

Figure 3:
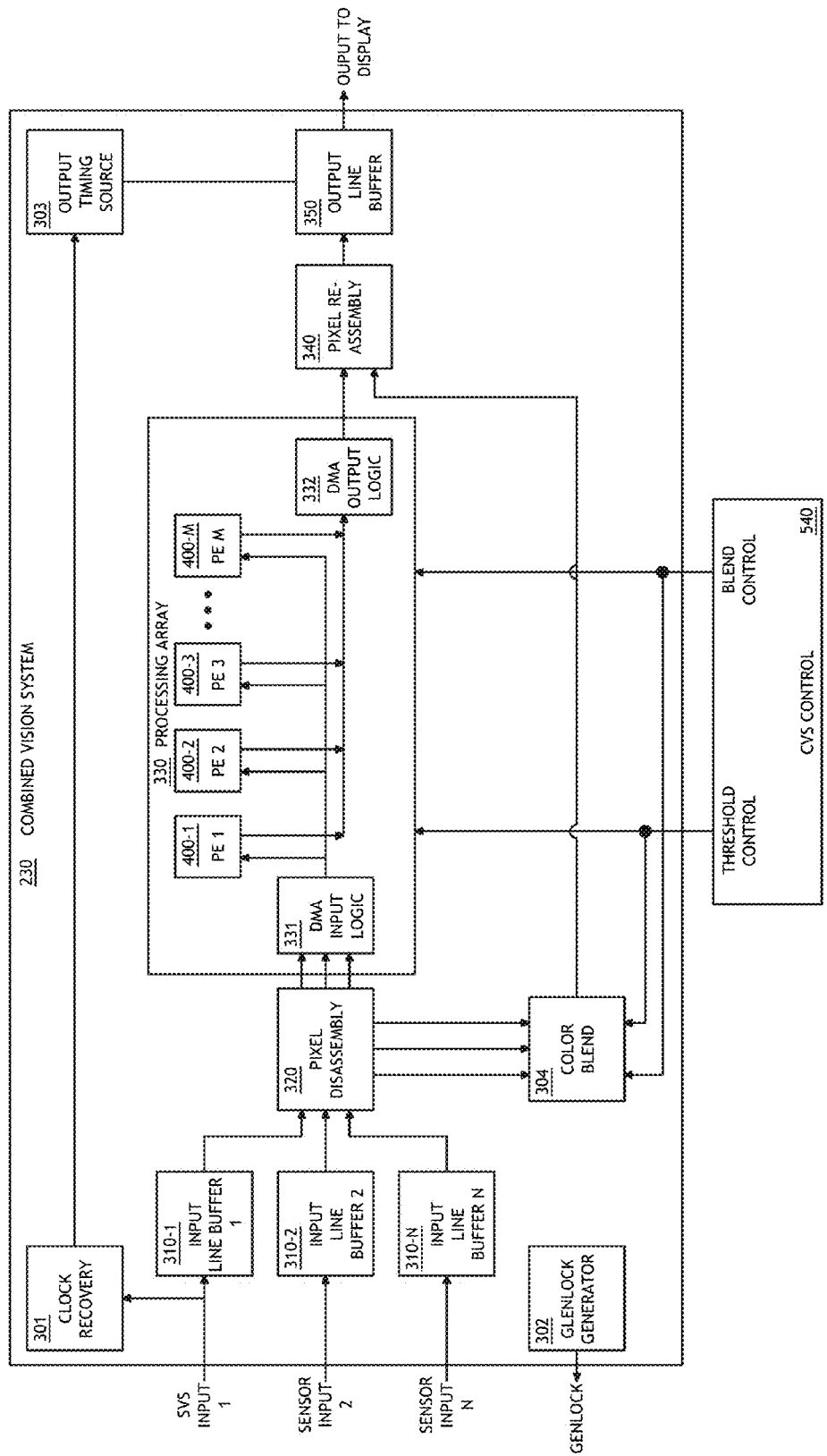
FIG. 3 depicts an exemplary combined vision system of some embodiments.

Referring now to FIG. 3, in some embodiments, the CVS 230 includes a clock recovery unit 301, a genlock generator 302, an output timing source 303, a color blend unit 304, a plurality of input line buffers 310-1, 310-2, . . . 310-N, a pixel disassembly unit 320, a processing array 330, a pixel reassembly unit 340, and an output line buffer 350. Some or all of the clock recovery unit 301, the genlock generator 302, the output timing source 303, the color blend unit 304, the plurality of input line buffers 310-1, 310-2, . . . 310-N, the pixel disassembly unit 320, the processing array 330, the pixel reassembly unit 340, and the output line buffer 350 may be communicatively coupled to each other.

In some embodiments, the CVS 230 is configured to receive a stream of synthetic images from the SVS 210 and receive a stream of sensor images. A first input line buffer 310-1 may be configured to receive pixel data of synthetic images from the SVS 210 as the synthetic images are outputted from the SVS 210. Similarly, at least one other input line buffer 310-2, . . . 310-N may be configured to receive pixel data of one or more sensor image streams. Each of the plurality of input line buffers 310-1, 310-2, . . . 310-N may be accessed by the pixel disassembly unit 320 and/or the processing array 330. The plurality of input line buffers 310-1, 310-2, . . . 310-N may be configured to ensure pixel data is always available for the processing array 330 to prevent the processing array 330 from starving for data to process. In some embodiments, each of the plurality of input line buffers 310-1, 310-2, . . . 310-N may be small (e.g., configured to temporarily store a few lines (e.g., rows or columns) of pixel data at a given time).

In some embodiments, the pixel disassembly unit 320 is configured to access and receive pixel data of the synthetic image and one or more sensor images contained in the plurality of input line buffers 310-1, 310-2, . . . 310-N. The pixel disassembly unit 320 may be configured to separate luminance components and chrominance components from the input pixel streams and send the luminance components to the processing array 330. In some embodiments, the processing array 330 is configured to perform fusion operations on the luminance components of color input channels because the luminance contains feature edge details of an image. In some embodiments, the pixel disassembly unit 320 may be configured to send the chrominance components of the pixel stream to the color blend unit 304 (e.g., for performing color alpha blend operations).

Still referring to FIG. 3, in some embodiments, the processing array 330 may include one or more direct memory access (DMA) controllers and a plurality of processing elements 400-1, 400-2, 400-3, . . . , 400-M. The direct memory access (DMA) controllers may be configured for executing DMA input logic 331 and DMA output logic 332. In some embodiments, the processing array 330 may be implemented as a parallel processing array. Further, in some embodiments, the processing array may be implemented as a field programmable gate array (FPGA). For example, the processing array 330 may include an array of processing elements 400-1, 400-2, 400-2, . . . , 400-M arranged in parallel in a single row. Each of the processing elements may include a core configured to perform fusion operations (e.g., merge operations) on a received portion of the synthetic image and a received portion of the sensor image and output a fused image portion. In some embodiments, the processing array 330 is configured to perform fusion operations in real time to generate high quality (e.g., high resolution) combined images as synthetic images and sensor images are received.

In some embodiments, the processing array 330 may be implemented as a parallel processing array to reduce the latency in the execution of fusion operations. Parallel processing allows the computation of the fusion operations to be performed quicker, which reduces the latency. Amdahl's law states that a processing task can be sped up by an amount, S(M), by using a number of processing elements, M, limited by the fraction of the task that can be parallelized, P, as described by the following equation:

$$S(M)=1/((1-P)+P/M)$$

For example, in an exemplary embodiment where the processing array includes 48 parallel processing elements (i.e., M=48), where M is chosen based on computational requirements, input image size, and available resources of the processing array 330. Additionally, in some implementations, the fusion operations may be completely parallelizable, making P=100% (i.e., 1.0). Thus, by applying M and P, the speed up factor achieved is:

$$S(M)=1/((1-1.0)+1/48)=1/(1/48)=48.$$

As such, processing array 330 with parallel processing elements (e.g., 400-1, 400-2, 400-3, . . . , 400-M) may speed up the processing proportional to the number of parallel processing elements (e.g., 400-1, 400-2, 400-3, . . . , 400-M) of the processing array 330. Additionally, it is fully contemplated that the processing array 330 may be implemented with any number of parallel processing elements (e.g., 400-1, 400-2, 400-3, . . . , 400-M) so as to scale the processing array 330 to various input image sizes, various numbers of inputs, and/or increase the speed of execution of the fusion operations. Further, in some embodiments, it is fully contemplated that the processing array 330 may be implemented with extra (e.g., twice as many as required, four times as many as required, . . . ten times as many as required, or the like) parallel processing elements, where the extra processing elements may be initially set to be idle when they are not needed but may be activated to accommodate future computational needs (e.g., if the image resolution, frame rate, number of input images, or the like is increased in the future).

Generally, the total processing time for a single processing element in a parallel system is composed of the time it spends computing, communicating (e.g., to other processing elements), and idling (e.g., for an unbalanced system). As such, in some embodiments, the processing array 330, as well as the fusion operations that the processing array 330 is configured to perform, may be implemented to minimize the non-value added processing factors (i.e., the communication time and idle time). For example, in some embodiments, each of the processing elements (e.g., 400-1, 400-2, 400-3, . . . , 400-M) are evenly load balanced with work for executing the fusion operations such that there is no significant idle time by any individual processing element (e.g., 400-1, 400-2, 400-3, . . . , or 400-M). Additionally, for example, the processing array may be configured to utilize direct memory access (DMA) to relieve the processing elements (e.g., 400-1, 400-2, 400-3, . . . , 400-M) from performing communication tasks. Using direct memory access (DMA) to relieve the processing elements (e.g., 400-1, 400-2, 400-3, . . . , 400-M) may include performing any or all of the following tasks: loading the processing element memory with input pixel data; extracting output pixel data to send to the display; and/or duplicating pixels on the edge of each processing element's neighbor boundary to eliminate the need for processing elements to communicate to perform fusion operations.

In an exemplary embodiment, the processing array 330 may include a horizontal row of 48 processing elements (e.g., 400-1, 400-2, 400-3, . . . , 400-48). While the processing array may exemplarily be implemented with 48 processing elements, it is fully contemplated that the processing array 330 may be implemented with any number of processing elements to accommodate any processing demands. Further, it is fully contemplated that the processing array 330 may be implemented with any number of processing elements such that individual processing elements can be dynamically activated or deactivated to dynamically scale up or down the necessary processing throughput proportionally to the processing demands at any given time.

Additionally, the single row of parallel processing elements (e.g., 400-1, 400-2, 400-3, . . . , 400-M) arranged as an array (e.g. 1×N) of some embodiments is advantageous over a matrix arrangement (e.g. M×N) of processing elements because the single row of parallel processing elements (e.g., 400-1, 400-2, 400-3, . . . , 400-M) eliminates the requirement to communicate between elements.

In exemplary embodiments, each processing element (e.g., 400-1, 400-2, 400-3, . . . , 400-M) may be assigned a certain number of columns or rows of the input images. For example, if the processing array 330 has 48 processing elements (e.g., 400-1, 400-2, 400-3, . . . , 400-48) and if a particular input image has 768 input pixel columns, each processing element (e.g., 400-1, 400-2, 400-3, . . . , 400-48) may be assigned to process 16 pixel columns of the particular input image (768 columns/48 processing elements=16 columns per processing element), with the start of each image row aligned with processing element 1 (i.e., 400-1).

In some embodiments, the processing array 330 is configured to output fused images data to the pixel reassembly unit 340. The pixel reassembly unit 340 may be configured to reassemble (e.g., join) the output image luminance and chrominance components into a single pixel representation, and output the reassembled output image data (e.g., fused image data) to the output line buffer(s) 350.

In some embodiments, the CVS 230 includes at least one output line buffer 350. The at least one output line buffer 350 may be configured to temporarily store the reassembled output image data (e.g., fused image data) to ensure pixel data is always available for the output display 240, which prevents the display 240 from ever starving for data.

In some embodiments, the CVS 230 includes a color blend unit 304. The color blend unit may be configured to perform operations on the chrominance components of the input pixels. For example, the chrominance (e.g., color) components of the input channel may be alpha-blended to create a blended colorization of the output image. In some embodiments, the CVS 230 may be configured to receive monochrome sensor image inputs (e.g., from SWIR systems, MWIR systems, LWIR systems, or the like), which do not contribute a chrominance component to the output image. Additionally, in some embodiments, the CVS 230 may be configured to receive color synthetic images inputs (e.g., from the SVS 210) and color sensor image inputs (e.g., from a LIDAR system, or other at least one sensor 220), and the color blend unit 304 is configured to blend their colors for the fused output image. Embodiments of the invention may be configured to support color sources, monochrome sources, or some combination of color and monochrome sources.

In some embodiments, the CVS 230 may include or be coupled to a CVS control unit 540. The CVS control unit 540 may be configured to control inputs for threshold control and blend control. In some embodiments, the threshold control may be used to set a minimum luminance level on an input of the at least one sensor 220 (e.g., LIDAR system) so as to act as a noise gate on the scan of the at least one sensor 220 (e.g., LIDAR system). In some embodiments, the blend control may set the contribution of each input source (e.g., via fusion coefficient weighting for luminance and/or alpha value for chrominance) in the composite (i.e., combined or fused) output image.

In some embodiments, the CVS 230 is configured to receive input data sources synchronously or asynchronously. In some embodiments, it may not be possible to synchronize the image inputs for some system scenarios.

In some embodiments, the CVS 230 includes a genlock generator 302 configured to synchronize the at least one sensor 220 (e.g., camera systems, LIDAR systems, IR systems, or the like) by generating frame synchronization signals. A genlock signal is a signal that indicates to a sensor to start capturing a frame of data. Typically, a sensor begins to capture a frame of data at the start of one genlock pulse, and transmits the frame of data on the next received genlock pulse and uses nearly the whole frame period to transmit the data. As such, all sensors receiving the genlock signal start capturing a scene at the same point in time and transmit the captured frame of data later synchronized in time, wherein the data transmissions are evenly spaced over the frame period. The genlock signal rate may be selected to match the output display rate, which greatly reduces the requirement for buffering image data. In some embodiments, the CVS 230 is configured to support the use of genlock signals, but the CVS 230 may also be configured to support scenarios of receiving unsynchronized data sources. A benefit of having synchronized sources for the CVS 230 is that full frame buffers are not required in the CVS 230, which reduces the demand on memory resources. In some embodiments, the CVS 230 may be configured to support unsynchronized sources by including large memory buffers configured to store one or more full frames of data.

In embodiments configured to handle unsynchronized sources, the beginning of each of the data frames may be received at a different point in time. Additionally, in some embodiments, the image sources may be received at different rates of time (e.g., a 30 frames per second (FPS) on a first input and 60 FPS on a second input). In such embodiments, the CVS 230 may include a clock recovery unit 301. In some embodiments, to support inputs with different frame rates, the clock recovery unit 301 may be configured to recover the clock from one of the input data streams, which may be referred to as master channel, and to use the master channel as a master clock to drive the output by an output timing source 303. Each non-master (i.e., slave) input channel frame may be buffered in system memory in its entirety as it is received. For example, each non-master input frame may be sliced into columns and transferred by utilizing DMA into a particular processing element's dual-port memory (e.g., 402-1, 402-2, . . . , 402-N) (such as dual-port random access memory (RAM)). For example, if each sensor image input is a 1024×768 sub-region (for example, which may be required to match the screen size of an exemplary output display) of the 1920×1080 input video frame and if the processing array 330 includes 48 processing elements 400-1, . . . , 400-48, each processing element 400 is configured to store approximately 16 k pixels (i.e., 1024× 768/48=16,384) of the non-master input image in the particular processing element's dual-port RAM.

In some embodiments, the clock may be recovered (e.g., by the clock recovery unit 301) from one of the input video sources and used to drive (e.g., by the output timing source 303) the output. In some embodiments, for the master input channel, it is not necessary to buffer much of the image frame because the processing array 330 only performs fusion operations on a few lines of the streaming input video at a time. However, the non-master input channels may need to have their image data buffered as a full frame in dual-port memory (e.g., 402-2, . . . , 402-N), and the dual-port memory may be read as necessary to perform the fusion operations to generate the output. In such embodiments which use buffering on the dual-port memory (e.g., 402-2, . . . , 402-N) for the non-master input channels, data may always be available on the non-master input channels using this scheme, except possibly the first frame. However, the first frame may be considered not significant.

For example, in a particular exemplary embodiment, the total latency induced by the CVS 230 may be 15 lines of the input HD video frame (e.g., at 60 FPS), or 222 microseconds of latency (i.e., (1/60 of a second per frame)/(1125 lines per frame)*(15 lines)=222 microseconds) added to the signal path.

Figure 4:
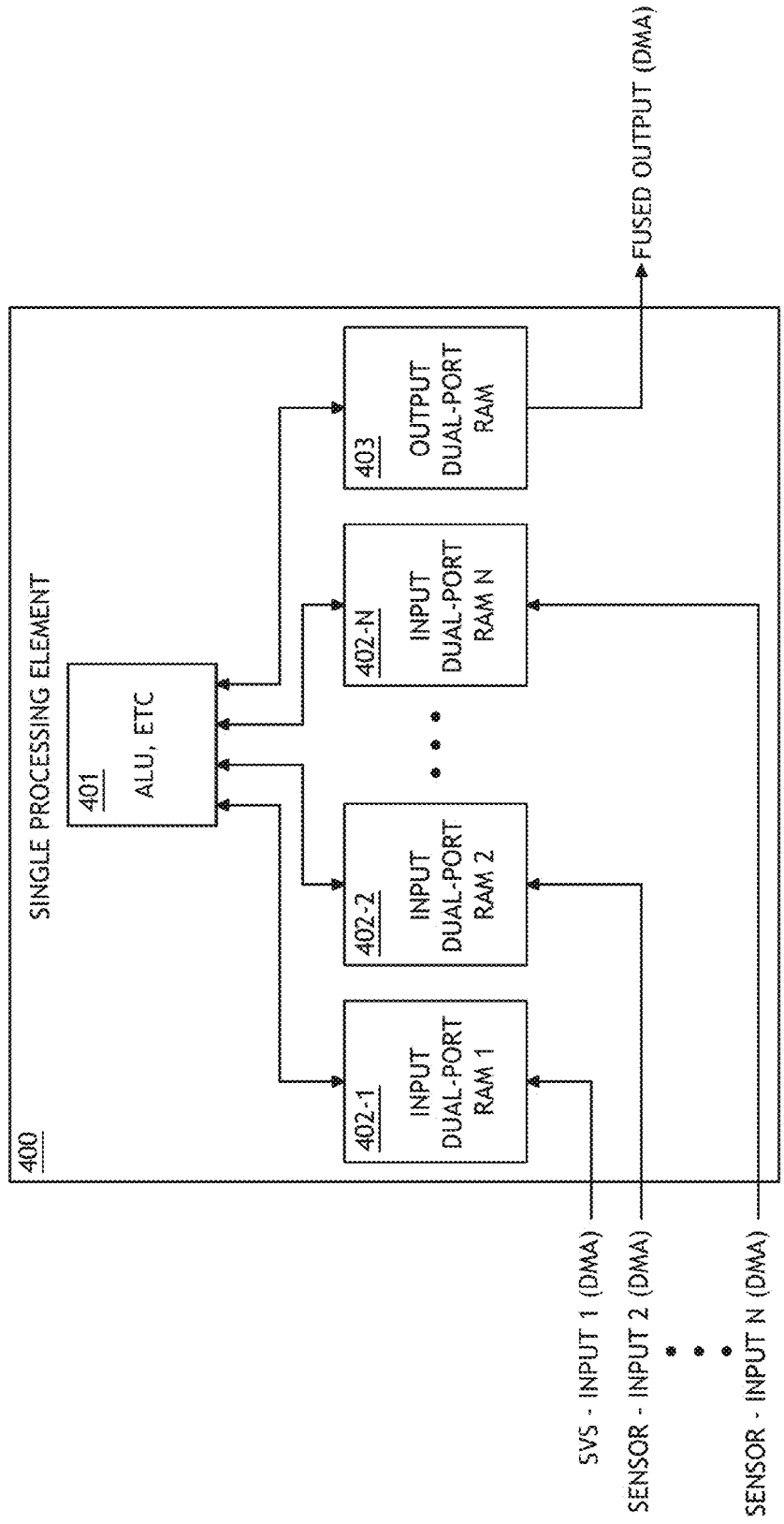
FIG. 4 depicts an exemplary single processing element of a processing array of some embodiments.

Referring now to FIG. 4, an exemplary processing element 400 of the processing array 330 of a CVS 230 of some embodiments is shown. In some embodiments, each processing element 400 includes a processing unit 401 (e.g., a processing core, an arithmetic logic unit (ALU), or the like), a plurality of memory elements (e.g., 402-1, 402-2, . . . , 402-N, and 403). Some or all of the processing unit 401 and the plurality of memory elements (e.g., 402-1, 402-2, . . . , 402-N, and 403) may be communicatively coupled.

The plurality of memory units (e.g., 402-1, 402-2, . . . , 402-N, and 403) may comprise a plurality of input memory elements (e.g., 402-1, 402-2, . . . , 402-N), which are each communicatively coupled to a particular SVS image input or sensor image input, and an output memory element (e.g., 403). Each of the plurality of input memory elements (e.g., 402-1, 402-2, . . . , 402-N) may comprise an input dual-port memory element (e.g., dual-port RAM). The output memory element (e.g., 403) may comprise an output dual-port memory element (e.g., dual-port RAM). The plurality of memory units (e.g., 402-1, 402-2, . . . , 402-N, and 403) may be configured for DMA and/or communicatively coupled to and/or controlled by a DMA controller.

In some embodiments, each processing element 400 of the processing array 330 of the CVS 230 is configured to perform one or more fusion operations to output a portion of a combined (e.g., fused, merged, or the like) image. Each processing element 400 may be configured to receive a portion of a synthetic image and one or more portions of one or more sensor images. Upon receiving the portion of the synthetic image and the one or more portions of the one or more sensor images, the processing element 400 may be configured to perform one or more fusion operations on the portion of the synthetic image and the one or more portions of the one or more sensor images and output a portion of a combined image. In some embodiments, performing the one or more fusion operations includes performing one or more transform encode operations, performing one or more merge operations, and performing one or more transform decode operations.

In some embodiments, performing one or more transform encode operations is configured to decompose each portion of the synthetic image and each of the one or more portions of the one or more sensor images into a spatial frequency representation of the image portions. In an exemplary embodiment, performing one or more transform encode operations comprises performing one or more discrete wavelet transform (DWT) encode operations; however, it is contemplated that in other embodiments that performing one or more transform encode operations may include performing any suitable transform (e.g., a discrete Laplacian transform, discrete Fourier transform, or the like) on the image portions. In some embodiments, decomposing each portion of the synthetic image and each of the one or more portions of the sensor images into a spatial frequency representation of the image portions includes decomposing each portion of the synthetic image and each of the one or more portions of the sensor images into a plurality (e.g., two, four, or more) of sub-image portions corresponding to sub-bands (e.g., HH, LH, HL, and LL sub-bands, or the like).

For example, in particular exemplary implementations, which may include HH, LH, HL, and LL sub-bands, the HH, LH, HL, and LL refer to coefficients representing the High (H) and Low (L) pass filtered coefficients from an image after being filtered in two directions (e.g., horizontally and vertically). Each application of the transform may apply both a high-pass filter and a low-pass filter to the data. The transform may be applied first in one direction (e.g., to the rows of an image) resulting in a 1-dimensional (1D) transform of the image divided into high (H) and low (L) frequency coefficients, and the transform may then be applied in the other direction (e.g., to the columns) of the 1D-transformed image from the previous step, resulting in a set of two-dimensional (2D) transform coefficients for the entire image (i.e., HH, LH, HL, and LL coefficients). Such a process decomposes an input image into coefficients that represent both the high vertical and horizontal spatial frequencies (i.e., HH), both low horizontal and vertical spatial frequencies (i.e., LL), and a mix of the two (i.e., HL and LH).

For example, in embodiments configured for performing one or more discrete wavelet transform (DWT) encode operations, decomposing each portion of the synthetic image and each of the one or more portions of the sensor images into a spatial frequency representation of the image portions comprises decomposing each portion of the synthetic image and each of the one or more portions of the sensor images into sub-bands (e.g., HH, LH, HL, and LL wavelets, or the like).

In some embodiments, upon performing one or more transform encode operations (e.g., upon decomposing each portion of the synthetic image and each of the one or more portions of the one sensor images into a spatial frequency representation of the image portions), performing the one or more fusion operations includes performing one or more merge operations. In some embodiments, performing one or more merge operations includes generating a single composite (e.g., combined) output frame portion of coefficients based on selecting desired content from the spatial frequency representations of the images. By selecting the most significant high frequency content coefficients of the input images, the portions of each of the input images where the pixels are changing the most are preserved. Generally, pixels change the most in regions where the image has the most detail or strongest contrast, which is usually the most interesting part of the image to a human observer. For example, in some embodiments, performing one or more merge operations includes generating an output image portion that has the most interesting features of each of the input image portions at any particular pixel location. In exemplary embodiments, where there is a single synthetic image portion input and a single sensor image portion input and where the single synthetic image portion input and the single sensor image portion input has been decomposed into HH, LH, HL, and LL wavelet coefficients, the selection of desired content for the output composite image portion is determined, as follows: for the LL wavelet, the content for the output composite image portion is selected as the average value of the single synthetic image portion input and the single sensor image portion input; and for each of the HL, LH, and HH wavelets, the content for the output composite image portion is selected as the maximum absolute value of the single synthetic image portion input and the single sensor image portion input.

In some embodiments, upon performing one or more merge operations, performing the one or more fusion operations includes performing one or more transform decode operations configured to convert the plurality of sub-image portions (e.g., LL, HL, LH, and HH wavelets, or the like) into a combined output image. That is, in some embodiments, once a single composite coefficient output frame portion has been created by selecting the appropriate spatial frequency coefficients from the input frames, the output image is recreated by applying the inverse of the forward transform to the single composite coefficient output frame portion. In some embodiments, applying the inverse of the forward transform includes applying an inverse discrete wavelet transform, an inverse discrete Laplacian transform, an inverse discrete Fourier transform, or the like. In some embodiments, performing one or more transform decode operations results in a combined output image which contains the most significant image features at any particular pixel location from each of the input sources.

Additionally, some embodiments, which are configured to utilize a discrete wavelet transform or inverse discrete wavelet transform, are configured to utilize a lifting scheme so as to reduce the memory and computational complexity required to performance of the one or more fusion operations.

Figure 5:
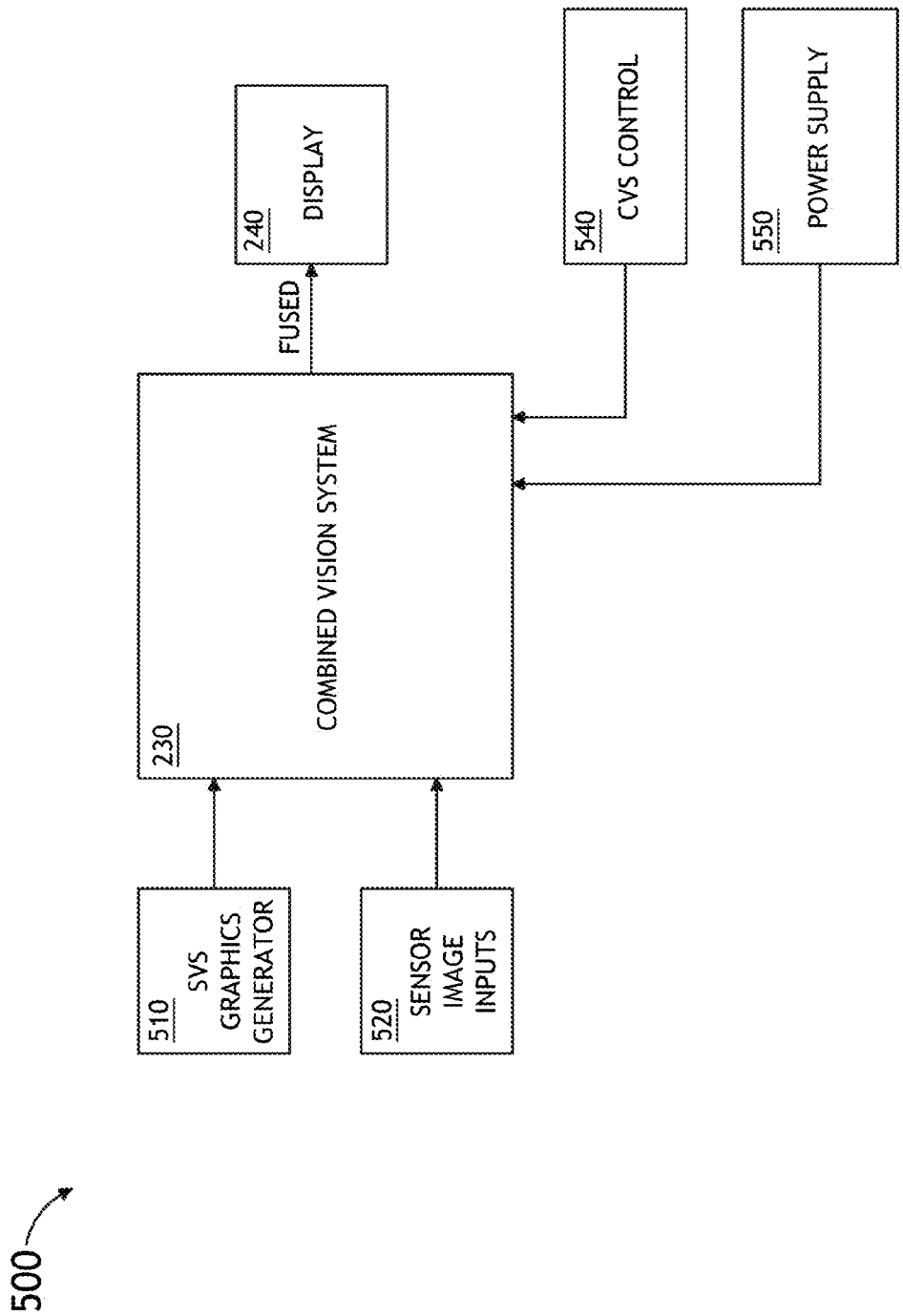
FIG. 5 depicts a further exemplary system topology of some embodiments.

Referring now to FIG. 5, a diagram of an exemplary system 500 of a vehicle (e.g., an aircraft, an automobile, or the like) of some embodiments is shown. In some embodiments, the system 500 includes: a synthetic vision system 210, which includes an SVS graphics generator 510; a sensor image input device 520; a CVS 230; one or more displays 240; a CVS control unit 540; and a power supply 550. In some embodiments, some or all of the SVS graphics generator 510, the sensor image input device 520, the CVS 230, the one or more displays 240, the CVS control unit 540, and the power supply 550 are communicatively coupled.

Figure 6C:
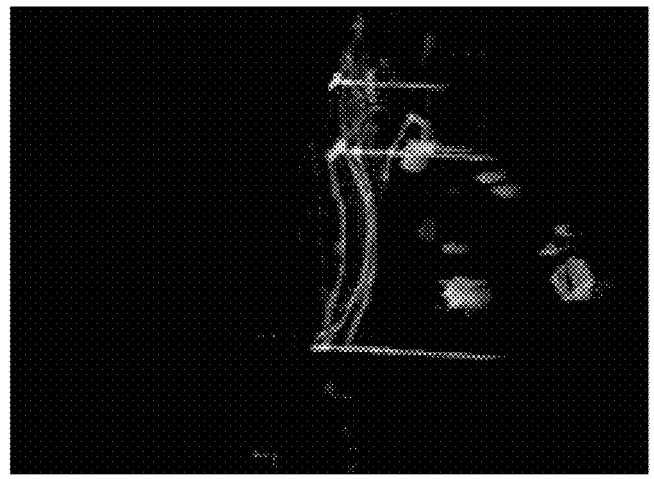
FIG. 6C depicts an exemplary combined image output of a combined vision system.
Figure 6B:
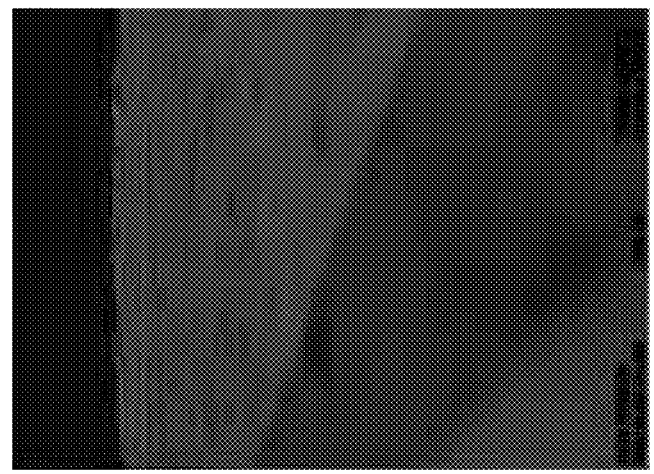
FIG. 6B depicts an exemplary synthetic vision system image input.
Figure 6A:
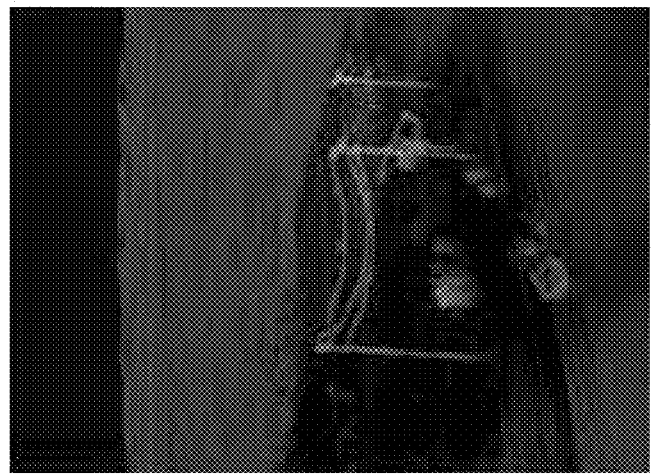
FIG. 6A depicts an exemplary sensor image input.

Referring now to FIGS. 6A, 6B, and 6C, exemplary depictions of a sensor image input (FIG. 6A) received by the CVS 230, an SVS image input (FIG. 6B) received by the CVS 230, and a combined (e.g., fused, merged, or the like) image output (FIG. 6C) generated by the CVS 230 based on the sensor image input and the SVS image input are shown.

In the present disclosure, the methods, operations, and/or functionality disclosed may be implemented as sets of instructions or software readable and/or executable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the disclosed subject matter. The accompanying claims may present elements of the various steps in a sample order, and are not necessarily meant to be limited to the specific order or hierarchy presented.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
receiving a stream of synthetic images from a synthetic vision system;
receiving a stream of sensor images from at least one sensor, wherein at least one of the stream of synthetic images and the stream of sensor images includes color images;
separating luminance components and chrominance components for each image of the stream of synthetic images and the stream of sensor images;
sending the luminance components to a processing array;
performing, by the processing array including a plurality of parallel processing elements, one or more fusion operations on a particular synthetic image of the stream of the synthetic images and one or more particular sensor images of the stream of the sensor images to generate at least one combined image;
upon performing the one or more fusion operations on the particular synthetic image of the stream of the synthetic images and the one or more particular sensor images of the stream of sensor images, reassembling the luminance components and chrominance components into the at least one combined image; and
outputting the at least one combined image to a display for presentation to a user.

2. The method of claim 1, wherein performing the one or more fusion operations comprises:
performing one or more transform encode operations;
performing one or more merge operations; and
performing one or more transform decode operations.

3. The method of claim 1, further comprising:
synchronizing the stream of synthetic images and the stream of sensor images.

4. The method of claim 3, further comprising:
buffering less than a full frame for each image of the stream of synthetic images and the stream of sensor images.

5. The method of claim 1, wherein the stream of synthetic images and the stream of sensor images are unsynchronized.

6. The method of claim 5, further comprising:
recovering a clock from the stream of synthetic images;
using the clock from the stream of synthetic images as a master clock;
buffering each frame of the stream of sensor images; and
outputting the at least one combined image based on the clock from the stream of synthetic images.

7. The method of claim 1, further comprising:
adjusting at least one of a threshold control or a blend control.

8. The method of claim 1, further comprising:
sending the chrominance components to a color blend unit.

9. The method of claim 8, further comprising:
blending the chrominance components for the at least one combined output image.

10. A combined vision system, comprising:
a plurality of input line buffers, wherein a first input line buffer of the plurality of input line buffers is configured to store at least a portion of one or more synthetic image inputs of a stream of synthetic images, wherein at least a second input line buffer is configured to store at least a portion of one or more sensor image inputs of a stream of sensor images;

a pixel disassembly unit configured to separate luminance components and chrominance components from the stream of synthetic images and the stream of sensor images and to send the luminance components to a processing array;

the processing array including a row of parallel processing elements, wherein each processing element includes a plurality of memory elements and a processing unit, wherein each processing element is configured to perform one or more fusion operations on a portion of a particular synthetic image of the stream of the synthetic images and a portion of one or more particular sensor images of the stream of the sensor images, wherein each processing element is further configured to output a portion of a combined image; and a pixel reassembly unit configured to reassemble the output image luminance and chrominance components into the portion of the combined image.

11. The combined vision system of claim 10, wherein each processing element is further configured to:

perform one or more transform encode operations;

perform one or more merge operations; and perform one or more transform decode operations.

12. The combined vision system of claim 10, wherein each of the plurality of line buffers is configured to store less than a full image frame.

13. The combined vision system of claim 10, wherein each of the plurality of memory elements comprises a dual-port memory element.

14. The combined vision system of claim 10, further comprising:

a genlock generator.

15. The combined vision system of claim 10, further comprising:

a clock recovery unit configured to recover a clock from one of the stream of synthetic images and the stream of sensor images and to use the clock as a master clock; and an output timing source.

16. A system, comprising:

a synthetic vision system;

at least one sensor;

at least one display; and a combined vision system, the combined vision system being coupled to the synthetic vision system, the at least one sensor, and the at least one display, wherein the combined vision system includes:

a pixel disassembly unit configured to separate luminance components and chrominance components from a stream of synthetic images and a stream of sensor images, to send the luminance components to a processing array, and to send the chrominance components to a color blend unit, wherein at least one of the stream of synthetic images and the stream of sensor images includes color images; and the processing array including a row of parallel processing elements, wherein each processing element includes a plurality of memory elements and a processing unit, wherein each processing element is configured to perform one or more fusion operations on a portion of a particular synthetic image of the stream of synthetic images and a portion of one or more particular sensor images of the stream of sensor images, wherein each processing element is further configured to output a portion of a combined image, wherein the combined vision system is configured to output combined images to the at least one display.

17. The system of claim 16, wherein the at least one sensor comprises at least one of one or more light radar systems, one or more infrared systems, or one or more cameras.

18. The system of claim 16, wherein the color blend unit is configured to blend the chrominance components for the portion of the combined image.

* * * * *